US010597764B2

(12) United States Patent
Chida et al.

(10) Patent No.: US 10,597,764 B2
(45) Date of Patent: Mar. 24, 2020

(54) SUBSTRATE FOR HOT-DIP GALVANIZING OR HOT-DIP GALVANNEALING, PRODUCTION METHOD THEREFOR, AND HOT-DIP GALVANIZED STEEL SHEET OR HOT-DIP GALVANNEALED STEEL SHEET

(71) Applicant: Kobe Steel, Ltd., Kobe-shi (JP)

(72) Inventors: Minoru Chida, Kakogawa (JP); Hiroshi Irie, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/323,165

(22) PCT Filed: Aug. 11, 2015

(86) PCT No.: PCT/JP2015/072725
§ 371 (c)(1),
(2) Date: Dec. 30, 2016

(87) PCT Pub. No.: WO2016/031556
PCT Pub. Date: Mar. 3, 2016

(65) Prior Publication Data
US 2017/0137923 A1   May 18, 2017

(30) Foreign Application Priority Data

Aug. 29, 2014   (JP) .................. 2014-175945
Mar. 17, 2015   (JP) .................. 2015-053267

(51) Int. Cl.
| C23C 2/06 | (2006.01) |
| C23C 2/40 | (2006.01) |
| C23C 2/02 | (2006.01) |
| C21D 9/46 | (2006.01) |
| C21D 6/00 | (2006.01) |
| C21D 1/26 | (2006.01) |
| C22C 38/38 | (2006.01) |
| C22C 38/32 | (2006.01) |
| C22C 38/22 | (2006.01) |

(Continued)

(52) U.S. Cl.
CPC .............. *C23C 2/06* (2013.01); *B32B 15/012* (2013.01); *B32B 15/013* (2013.01); *B32B 15/04* (2013.01); *B32B 15/043* (2013.01); *B32B 15/18* (2013.01); *C21D 1/26* (2013.01); *C21D 1/76* (2013.01); *C21D 6/005* (2013.01); *C21D 6/008* (2013.01); *C21D 9/46* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C23C 2/02* (2013.01); *C23C 2/04* (2013.01); *C23C 2/12* (2013.01); *C23C 2/26* (2013.01); *C23C 2/28* (2013.01); *C23C 2/40* (2013.01); *C23C 30/00* (2013.01); *C23C 30/005* (2013.01); *C21D 1/74* (2013.01); *Y10T 428/12757* (2015.01); *Y10T 428/12792* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01)

(58) Field of Classification Search
CPC .... C23C 2/02; C23C 2/40; C23C 2/06; C23C 2/04; C23C 2/12; C23C 2/26; C23C 2/28; C23C 30/00; C23C 30/005; C21D 9/46; C21D 6/005; C21D 6/008; C21D 1/26; C21D 1/74; C21D 1/76; Y10T 428/12757; Y10T 428/12792; Y10T 428/12799; Y10T 428/12958; Y10T 428/12972; Y10T 428/12979; Y10T 428/12993; C22C 38/00; C22C 38/06; C22C 38/38; C22C 38/14; C22C 38/12; C22C 38/04; C22C 38/02; C22C 38/002; C22C 38/32; C22C 38/22; C22C 38/18; C22C 38/26; C22C 38/28; C22C 38/34; B32B 15/013; B32B 15/012; B32B 15/04; B32B 15/043; B32B 15/18
See application file for complete search history.

(56) References Cited

U.S. PATENT DOCUMENTS

| 8,241,759 B2 | 8/2012 | Nakagaito et al. |
| 2006/0057417 A1 | 3/2006 | Tada et al. |

(Continued)

FOREIGN PATENT DOCUMENTS

| JP | 5-263206 A | 10/1993 |
| JP | 2004-263271 A | 9/2004 |

(Continued)

OTHER PUBLICATIONS

International Search Report dated Nov. 17, 2015 in PCT/JP2015/072725 filed Aug. 11, 2015.

(Continued)

*Primary Examiner* — Michael E. La Villa
(74) *Attorney, Agent, or Firm* — Oblon, McClelland, Maier & Neustadt, L.L.P.

(57) ABSTRACT

Provided is a technique in which a reduction annealing method is used to efficiently produce a high-strength hot-dip galvanizing substrate or high-strength hot-dip galvannealing substrate, which is useful as a raw material for producing a high-strength plated steel sheet suppressed in the occurrence of bare spot. The substrate for hot-dip galvanizing or hot-dip galvannealing of the present invention satisfies the following condition: when the mapping intensity of Fe, which is obtained by using an electron probe microanalyser in a measurement field of view of 33.6 μm×41.4 μm on the surface after reduction annealing, of 0 to 240 is divided into 16 parts at an interval of 15, the area occupied by a mapping intensity of 195 or more has 70% or more.

15 Claims, No Drawings

(51) Int. Cl.

| | | |
|---|---|---|
| C22C 38/14 | (2006.01) | |
| C22C 38/12 | (2006.01) | |
| C22C 38/06 | (2006.01) | |
| C22C 38/04 | (2006.01) | |
| C22C 38/02 | (2006.01) | |
| C22C 38/00 | (2006.01) | |
| B32B 15/01 | (2006.01) | |
| C22C 38/34 | (2006.01) | |
| C22C 38/26 | (2006.01) | |
| C22C 38/28 | (2006.01) | |
| C21D 1/76 | (2006.01) | |
| C23C 2/26 | (2006.01) | |
| C23C 30/00 | (2006.01) | |
| C23C 2/04 | (2006.01) | |
| B32B 15/04 | (2006.01) | |
| C23C 2/12 | (2006.01) | |
| C23C 2/28 | (2006.01) | |
| B32B 15/18 | (2006.01) | |
| C21D 1/74 | (2006.01) | |

(56) References Cited

U.S. PATENT DOCUMENTS

| | | |
|---|---|---|
| 2010/0104891 A1 | 4/2010 | Nakagaito et al. |
| 2010/0304183 A1 | 12/2010 | Honda et al. |
| 2014/0234656 A1 | 8/2014 | Fujita et al. |
| 2015/0125716 A1 | 5/2015 | Kojima et al. |
| 2016/0032439 A1 | 2/2016 | Kojima et al. |

FOREIGN PATENT DOCUMENTS

| | | |
|---|---|---|
| JP | 2004-263295 A | 9/2004 |
| JP | 2008-266778 A | 11/2008 |
| JP | 2013-142198 A | 7/2013 |
| WO | 2013/047804 A1 | 4/2013 |

OTHER PUBLICATIONS

International Preliminary Report on Patentability and Written Opinion of the International Searching Authority dated Feb. 28, 2017 in PCT/JP2015/072725 filed Aug. 11, 2015 (submitting English translation).

SUBSTRATE FOR HOT-DIP GALVANIZING OR HOT-DIP GALVANNEALING, PRODUCTION METHOD THEREFOR, AND HOT-DIP GALVANIZED STEEL SHEET OR HOT-DIP GALVANNEALED STEEL SHEET

TECHNICAL FIELD

The present invention relates to a high-strength hot-dip galvanizing substrate or high-strength hot-dip galvannealing substrate, which is useful as a raw material for a high-strength hot-dip galvanized steel sheet or high-strength hot-dip galvannealed steel sheet in which the occurrence of bare spot is suppressed, and a production method therefor, as well as the high-strength hot-dip galvanized steel sheet or high-strength hot-dip galvannealed steel sheet.

BACKGROUND ART

In recent years, in order to improve the fuel efficiency of automobiles and the like and enhance the corrosion resistance and the like, a high-strength plated steel sheet obtained by subjecting a high-tension steel sheet to hot-dip galvanizing or hot-dip galvannealing is widely used. As a high-strength plated steel sheet, a steel sheet having an improved property such as strength, ductility, or formability by addition of Si or Mn is increasingly used.

Meanwhile, Si and Mn are easily oxidizable elements that are more likely to be oxidized than Fe is. For this reason, even in a reducing atmosphere for Fe, Si and Mn are often easily oxidized and concentrated on the steel sheet surface to form oxides. These oxides considerably decrease the plating wettability between molten zinc and the steel sheet surface at the time of plating. This causes occurrence of bare spot or white spot, thereby deteriorating an outer appearance of the plated steel sheet.

Therefore, various methods are proposed in order to produce a high-strength plated steel sheet suppressed in occurrence of bare spot accompanying the addition of Si or Mn. For example, Patent Literature 1 proposes a method for producing a hot-dip galvanized steel sheet containing Si and Mn and being excellent in plating wettability and pickup resistance. Specifically, this literature discloses a method in which, in continuous hot-dip galvanizing equipment provided with a heating furnace of all radiant tube type, annealing is carried out sequentially through the steps of preheating, heating, and soaking while a logarithmic ratio of a hydrogen partial pressure to a water vapor partial pressure within the furnace is controlled.

CITATION LIST

Patent Literature

Patent Literature 1: Japanese Unexamined Patent Application Publication (JP-A) No. 2013-142198

SUMMARY OF INVENTION

Technical Problem

However, in Patent Literature 1, the annealing furnace must be divided into three sections, and control must be made so that the sections may have a largely different atmosphere from each other. This necessitates a large equipment investment, and greatly increases the cost.

The present invention has been made in view of the above-described circumstances, and an object thereof is to provide a technique in which a reduction annealing method is used to efficiently produce a high-strength hot-dip galvanizing substrate or high-strength hot-dip galvannealing substrate, which is useful as a raw material for producing a high-strength plated steel sheet in which the occurrence of bare spot is suppressed.

Solution to Problem

A substrate for hot-dip galvanizing or hot-dip galvannealing according to the present invention that has solved the above-described problem is, in summary, a substrate for galvanization obtained by subjecting a steel sheet containing in percent by mass, C: 0.06% to 0.3%, Si: 1.00% to 1.6%, Mn: 1% to 3%, and Al: more than 0% and 0.1% or less, and satisfying a ratio of Si/Mn of 1.0 or less to reduction annealing, wherein, when a mapping intensity of Fe, which is observed in a measurement field of view of 33.6 μm×41.4 μm on a surface of the substrate for galvanization by performing mapping of Fe using an electron probe microanalyser, of 0 to 240 is divided into 16 parts at an interval of 15, an area occupied by a mapping intensity of 195 or more has 70% or more.

The substrate for galvanization may further contain in percent by mass at least one kind belonging to any of the following (a) to (c):

(a) at least one kind selected from the group consisting of Cr: more than 0% and 1% or less and Mo: more than 0% and 1% or less, (b) B: more than 0% and 0.005% or less, and (c) at least one kind selected from the group consisting of Ti: more than 0% and 0.1% or less and Nb: more than 0% and 0.1% or less.

A method for producing a substrate for hot-dip galvanizing or hot-dip galvannealing according to the present invention that has solved the above-described problem is, in summary, a method for producing a substrate for galvanization by subjecting a steel sheet having a chemical composition described above to reduction annealing in a nitrogen atmosphere containing $H_2$: 5% by volume to 10% by volume, wherein the reduction annealing includes a heating step of holding a sheet temperature of the steel sheet for 20 seconds or more in a temperature range of 600° C. or higher and 620° C. or lower.

The scope of the present invention also includes a hot-dip galvanized steel sheet or an hot-dip galvannealed steel sheet obtained by using the substrate for hot-dip galvanizing or hot-dip galvannealing described above.

EFFECTS OF INVENTION

According to the present invention, a high-strength hot-dip galvanizing substrate or high-strength hot-dip galvannealing substrate can be efficiently produced by the reduction annealing method.

By using the production method of the present invention, a high-strength hot-dip galvanized steel sheet or high-strength hot-dip galvannealed steel sheet suppressed in the occurrence of bare spot can be provided at a low cost.

DESCRIPTION OF EMBODIMENTS

A substrate for hot-dip galvanizing or hot-dip galvannealing of the present invention is obtained by subjecting a steel sheet containing Si and Mn to reduction annealing, wherein, when a mapping intensity of Fe, which is observed in a measurement field of view of 33.6 μm×41.4 μm on a surface of the substrate for galvanization by performing mapping of Fe using an electron probe microanalyser (EPMA: Electron Probe MicroAnalyser), of 0 to 240 is divided into 16 parts at an interval of 15, an area occupied by a mapping intensity of 195 or more has 70% or more. By using such a substrate for galvanization, a hot-dip galvanized steel sheet or hot-dip galvannealed steel sheet suppressed in the occurrence of bare spot can be obtained.

In the present description, the "substrate for galvanization" means a steel sheet which is used as a raw material for a high-strength hot-dip galvanized steel sheet or high-strength hot-dip galvannealed steel sheet, and which is a cold-rolled steel sheet having been subjected to reduction annealing and before being subjected to galvanization. In the following, the substrate for hot-dip galvanizing or hot-dip galvannealing may in some cases be abbreviated simply as a substrate for galvanization or a substrate.

In the present description, the "hot-dip galvanized steel sheet or hot-dip galvannealed steel sheet" means a plated steel sheet obtained by subjecting the substrate for galvanization to a hot-dip galvanizing treatment or hot-dip galvannealing treatment. In the following, the "hot-dip galvanized steel sheet or hot-dip galvannealed steel sheet" may in some cases be abbreviated simply as a galvanized steel sheet or plated steel sheet.

First, the way of accomplishing the present invention will be summarily described.

As described above, Si and Mn are easily oxidizable elements that are more likely to be oxidized than Fe is, so that Si and Mn are concentrated on the surface of the substrate for galvanization to form oxides. It is said that Si and Mn are concentrated on the surface of the substrate for galvanization by passing through a grain boundary formed by recrystallization. Therefore, the temperature at which Si and Mn are concentrated on the surface of the substrate for galvanization seems to be a temperature at which the recrystallization is completed, that is, at about 600° C. as a sheet temperature of the steel sheet.

The oxides formed on the surface of the substrate for galvanization can be roughly classified into three types of oxides including a Si oxide, a Mn oxide, and a Si—Mn composite oxide. There are a plurality of compounds for the Mn oxide depending on an oxidized state. Among these, $MnO_2$ has a comparatively low melting point of 535° C. The temperature at which the recrystallization of the steel sheet is completed is about 600° C. Therefore, it seems that, if the Mn oxide formed on the surface of the substrate for galvanization contains $MnO_2$ having a low melting point, $MnO_2$ is immediately brought into a molten state.

Further, it seems that, when the steel sheet is held in a temperature range of about 600° C. for a certain period of time, $MnO_2$ incorporates Si and Mn that are concentrated during the temperature-raising process of reduction annealing, and thereby forms a Si—Mn composite oxide in a molten state and having a low melting point widely on the surface of the substrate for galvanization. After the temperature is raised, the temperature is lowered. It seems that, if the melting point of the above-described Si—Mn composite oxide is lower than the sheet temperature of the steel sheet, the Si—Mn composite oxide starts to solidify. The Si—Mn composite oxide is solidified while being aggregated, and thus, it is predicted that a fine dome-shaped oxide is formed on the substrate for galvanization. For this reason, it seems that an occupancy of the oxide on the surface of the substrate for galvanization becomes small, and an exposed surface of Fe comes to appear widely. In the meantime, it seems that, when the temperature is raised without the steel sheet being held in the temperature range of about 600° C., the Si—Mn composite oxide in a molten state is not formed, and a Si oxide, a Mn oxide, or a Si—Mn oxide having a melting point exceeding 900° C. covers the surface of the substrate for galvanization widely, so that bare spot occurs more easily.

The present inventors have made further studies on the basis of such an inferred mechanism. As a result of this, the present inventors have found out the following matter. When reduction annealing is carried out so as to include a step of holding the steel sheet in the above-described temperature range of 600° C. or higher and 620° C. or lower for 20 seconds or more during the heating step in the reduction annealing, the form of the oxide formed on the surface of the substrate for galvanization is controlled, so that a substrate for galvanization having not less than a predetermined level of area of the exposed surface of Fe can be obtained and, when the substrate for galvanization is used, a plated steel sheet suppressed in occurrence of bare spot can be obtained. Thus, the present inventors completed the present invention.

As described above, the substrate for galvanization of the present invention is a substrate for galvanization obtained by subjecting a steel sheet containing in percent by mass, C: 0.06% to 0.3%, Si: 1.00% to 1.6%, Mn: 1% to 3%, and Al: more than 0% and 0.1% or less, and satisfying a ratio of Si/Mn of 1.0 or less to reduction annealing, wherein, when a mapping intensity of Fe, which is observed in a measurement field of view of 33.6 μm×41.4 μm on a surface of the substrate for galvanization by performing mapping of Fe using an electron probe microanalyser, of 0 to 240 is divided into 16 parts at an interval of 15, an area occupied by a mapping intensity of 195 or more has 70% or more.

In the following, the area in which the mapping intensity of Fe is 195 or more as measured in the above-described manner may in some cases be referred to simply as Fe exposure area. In addition, the occupancy of the Fe exposure area relative to the whole measurement field of view may be referred to simply as Fe exposure rate in some cases.

First, the substrate for galvanization of the present invention satisfies an Fe exposure rate of at least 70%. The larger the Fe exposure rate is, the higher the reactivity to molten zinc is, whereby occurrence of bare spot can be suppressed. A lower limit of the Fe exposure rate is preferably at least 72%, more preferably at least 75%. The larger the Fe exposure rate is, the more preferable it is; however, it is impossible in industrial production to attain 100%.

Further, the substrate for galvanization satisfies the following chemical composition.

C: 0.06% to 0.3%

C is an element that is needed in increasing the strength of the plated steel sheet. It is difficult to ensure the strength when the amount of C is less than 0.06%. For this reason, the lower limit of the amount of C is set to at least 0.06%. The lower limit of the amount of C is preferably at least 0.07%, more preferably at least 0.08%. However, when the amount of C is excessive, the weldability decreases. Therefore, the upper limit of the amount of C is set to at most 0.3%. The upper limit of the amount of C is preferably at most 0.28%, more preferably at most 0.25%.

Si: 1.00% to 1.6%

Si is a solid solution reinforcing element and is effective in increasing the strength of the plated steel sheet. In addition, Si produces an effect of enhancing the close adhesion property of plating particularly with respect to processing that involves sliding on the plated layer. For this reason, the lower limit of the amount of Si is set to at least 1.00%. The lower limit of the amount of Si is preferably at least 1.1%, more preferably at least 1.2%. However, when the amount of Si exceeds 1.6%, the aggregation of the oxide becomes insufficient, so that an Fe exposure rate of at least 70% cannot be ensured, making it impossible to suppress the occurrence of bare spot. For this reason, the upper limit of the amount of Si is set to at most 1.6%. The upper limit of the amount of Si is preferably at most 1.5%, more preferably at most 1.4%.

Mn: 1% to 3%

Mn is an element that is useful for enhancing a quenching property and increasing the strength of the plated steel sheet. For this reason, the lower limit of the amount of Mn is set to at least 1%. The lower limit of the amount of Mn is preferably at least 1.2%, more preferably at least 1.4%. However, when the amount of Mn exceeds 3%, segregation of Mn occurs to decrease the formability. For this reason, the upper limit of the amount of Mn is set to at most 3%. The upper limit of the amount of Mn is preferably at most 2.9%, more preferably at most 2.8%.

Al: more than 0% and 0.1% or less

Al is added for the purpose of deacidification and produces an effect of promoting the ferrite formation and enhancing the ductility. For this reason, the lower limit of the amount of Al is set to more than 0%. The lower limit of the amount of Al is preferably at least 0.02%, more preferably at least 0.04%. However, excessive addition increases the number of Al-based coarse intervening substances, causing deterioration of the hole enlarging property or surface flaws. For this reason, the upper limit of the amount of Al is set to at most 0.1%. The upper limit of the amount of Al is preferably at most 0.09%, more preferably at most 0.08%.

Ratio of Si/Mn: 1.0 or less

Further, the amount of Si (% by mass) and the amount of Mn (% by mass) in the steel must satisfy a relationship such that the ratio of Si/Mn is 1.0 or less. When the amount of Si is larger than the amount of Mn, generation of $SiO_2$ during reduction annealing cannot be suppressed. Because $SiO_2$ does not react with molten zinc, bare spot occurs when $SiO_2$ is formed on the surface of the substrate. The upper limit of Si/Mn is preferably 0.98 or less, more preferably 0.95 or less. The lower limit of Si/Mn is preferably 0.33 or more, more preferably 0.38 or more, in consideration of the lower limit of the amount of Si and the upper limit of the amount of Mn.

The elements in the steel that are used in the present invention are as described above, the remainder being iron and inevitable impurities. Examples of the inevitable impurities include elements that are taken into the steel depending on circumstances of starting materials, source materials, production equipment, and the like, such as S, P, H, and N.

Further, the above substrate may contain the following optional components in percent by mass.

At least one kind selected from the group consisting of Cr: more than 0% and 1% or less and Mo: more than 0% and 1% or less Both of Cr and Mo are elements that are effective for improving the quenching property. These elements may be incorporated either singly or in a suitable combination.

Cr: more than 0% and 1% or less

Cr is an element that effectively contributes to strengthening the plated steel sheet by improving the quenching property and forming hard bainite or martensite in a microtexture of the substrate. For this reason, the lower limit of the amount of Cr is preferably more than 0%, more preferably 0.1% or more. However, when the amount of Cr exceeds 1%, this effect is saturated. For this reason, the upper limit of the amount of Cr is preferably set to 1% or less, more preferably 0.9% or less. Cr scarcely contributes to the suppression of the occurrence of bare spot.

Mo: more than 0% and 1% or less

Mo is an element that effectively contributes to strengthening the plated steel sheet by improving the quenching property and forming hard bainite or martensite in the microtexture of the substrate. For this reason, the lower limit of the amount of Mo is preferably more than 0%, more preferably 0.1% or more. However, when the amount of Mo exceeds 1%, this effect is saturated, and also a large increase in costs is invited. For this reason, the upper limit of the amount of Mo is preferably set to 1% or less, more preferably 0.9% or less.

B: more than 0% and 0.005% or less

B is an easily oxidizable element similarly to Si and Mn. However, it is said that, in moving to the surface of the substrate during the reduction annealing process, B moves to the surface of the substrate irrespective of the formation of the grain boundary, whereas Si and Mn move along the grain boundary formed by recrystallization. An oxide of B, that is, $B_2O_3$ has a low melting point and forms a glassy composite oxide to lower the melting point of the composite oxide. Although the melting point of the composite oxide is not known, it seems that, by addition of B, the glassy composite oxide having a low melting point becomes more likely to be formed, and the oxide is aggregated in a dome shape, whereby the Fe exposure rate becomes more likely to increase. In consideration of the ease of formation of the composite oxide, for example, the lower limit of the amount of B is preferably more than 0%, more preferably 0.0003% or more. However, even when the amount of B exceeds 0.005%, the effect of forming the composite oxide is saturated, and the plating property is not improved any more. For this reason, the upper limit of the amount of B is preferably set to 0.005% or less, more preferably 0.004% or less.

At least one kind selected from the group consisting of Ti: more than 0% and 0.1% or less and Nb: more than 0% and 0.1% or less Both of Ti and Nb produce an effect of miniaturizing the microtexture and are elements that enhance the balance between the strength and the ductility. These elements may be incorporated either singly or in a suitable combination.

Ti: more than 0% and 0.1% or less

Ti is an element that is also effective in strengthening the plated steel sheet by being deposited in the ferrite. For this reason, the lower limit of the amount of Ti is preferably more than 0%, more preferably 0.01% or more. However, when the amount of Ti exceeds 0.1%, this effect is saturated. For this reason, the upper limit of the amount of Ti is preferably set to 0.1% or less, more preferably 0.09% or less, and still more preferably 0.08% or less.

Nb: more than 0% and 0.1% or less

Nb is an element that is also effective in strengthening the plated steel sheet by being deposited in the ferrite. For this reason, the lower limit of the amount of Nb is preferably more than 0%, more preferably 0.01% or more. However, when the amount of Nb exceeds 0.1%, the ductility of the ferrite is decreased, thereby lowering the formability. For this reason, the upper limit of the amount of Nb is preferably set to 0.1% or less, more preferably 0.09% or less, and still more preferably 0.08% or less.

The substrate for galvanization of the present invention has been described.

Next, a method for producing the substrate for galvanization of the present invention will be described.

The substrate for galvanization of the present invention is obtained by subjecting steel having the above chemical composition to melting, hot rolling, pickling, and cold rolling, and thereafter to the following reduction annealing. For the steps other than the reduction annealing, conditions that are generally carried out may be adopted. A preferable method for producing the substrate for galvanization of the present invention is as follows.

First, the steel having the above chemical composition is subjected to melting, and then to hot rolling. The heating temperature in the hot rolling is preferably set to about 1100° C. to 1300° C. in order to ensure the finishing temperature. The finishing temperature of the hot rolling is preferably set to 800° C. to 950° C.

An average cooling rate after the finishing rolling until the coil starting temperature is preferably set to 10° C./s to 120° C./s.

The coiling temperature is preferably set to 700° C. or lower. When the coiling temperature exceeds 700° C., a scale formed on the surface of the steel sheet is thickened, thereby deteriorating the pickling property. For this reason, the upper limit of the coiling temperature is preferably set to 700° C. or lower. On the other hand, the lower limit of the coiling temperature is not particularly limited. However, when the coiling temperature is too low, a low-temperature transformation phase is excessively generated, and the steel sheet becomes too hard, thereby lowering the cold-rolling property. For this reason, the lower limit of the coiling temperature is preferably 250° C. or higher, more preferably 400° C. or higher.

The steel sheet after hot rolling, which has been produced in this manner, is subjected to pickling. The pickling may be carried out in accordance with a conventional method, and the pickling may be carried out either at a time or plural times.

After the pickling, cold rolling is carried out. It is preferable that a draft of the cold rolling is set to 15% or more. The reason therefor is as follows. In order to set the draft to less than 15%, the sheet thickness of the steel sheet in the hot rolling step must be reduced. When the sheet thickness is reduced in the hot rolling step, the steel sheet length increases, and it takes a lot of time to perform the pickling, thereby lowering the productivity. For this reason, the lower limit of the draft is preferably 15% or more, more preferably 30% or more, and still more preferably 45% or more. However, when the draft exceeds 70%, the load of cold rolling becomes too large, thereby making it difficult to perform the cold rolling. For this reason, the upper limit of the draft is preferably set to 65% or less, more preferably 60% or less.

The steel sheet obtained in the above-described manner is subjected to reduction annealing. It is recommended that the reduction annealing is carried out, for example, on a continuous hot-dip galvanizing line (CGL). The CGL preferably has an all reduction type annealing furnace of an all radiant tube type. Details of the reduction annealing that characterizes the present invention is as follows.

Reducing atmosphere: $N_2$ with 5% by volume to 10% by volume of $H_2$

The heating treatment at the time of reduction annealing is carried out in a reducing atmosphere containing $H_2$ at 5% by volume to 10% by volume, the remainder being $N_2$ and inevitable impurities, in order to ensure the Fe exposure area on the surface of the substrate for galvanization. When the $H_2$ concentration is less than 5% by volume, oxidation of Fe cannot be suppressed. For this reason, the lower limit of the concentration of $H_2$ is set to 5% by volume or more. The lower limit of the concentration of $H_2$ is preferably 5.5% by volume or more, more preferably 6% by volume or more. However, when the concentration of $H_2$ exceeds 10% by volume, the Fe exposure area on the surface of the substrate for galvanization after the reduction annealing decreases, and the area rate of the spot increases. For this reason, the upper limit of the concentration of $H_2$ is set to 10% by volume or less. The upper limit of the concentration of $H_2$ is preferably 9.5% by volume or less, more preferably 9% by volume or less. The detailed reasons why the Fe exposure area decreases when the amount of $H_2$ in the nitrogen gas atmosphere exceeds 10% by volume are not clear. However, it seems that, when the $H_2$ concentration increases, Si and Mn are likely to be concentrated not only at the grain boundary but also within the grains and, as a result, the exposure of the Fe surface is hindered.

The reduction annealing is carried out by heating in the reducing atmosphere. The lower limit of the sheet temperature of the steel sheet in the reduction annealing is preferably set to about ($A_{c1}$+50° C.) or higher from the viewpoint of formability and the like. The lower limit of the sheet temperature of the steel sheet is more preferably 780° C. or higher, still more preferably 790° C. or higher. On the other hand, the upper limit of the sheet temperature of the steel sheet in the reduction annealing is preferably 900° C. or lower, more preferably 890° C. or lower. The temperature of 900° C. is an upper limit temperature of general reduction annealing.

The $A_{c1}$ point is calculated on the basis of the following formula (from "Koza Gendai no Kinzoku-gaku, Zairyo-hen 4, Tekko Zairyo", The Japan Institute of Metals and Materials).

$A_{c1}$ point=723−10.7×[Mn]−16.9×[Ni]+29.1×[Si]+16.9×[Cr]+290×[As]+6.38×[W]

As will be described in detail below, the largest characteristic feature of the present invention lies in that the holding time in the temperature range of 600° C. to 620° C. during the heating is controlled to 20 seconds or more. As long as this requirement is satisfied, the average temperature-raising rate during the heating is not particularly limited, so that an ordinarily used range can be suitably adopted except for the temperature range of 600° C. to 620° C. during the heating. For example, a general average temperature-raising rate is preferably 2° C./s or more, more preferably 4° C./s or more, and still more preferably 6° C./s or more, from the viewpoint of productivity. However, when the average temperature-raising rate exceeds 20° C./s, recrystallization behavior becomes non-uniform, and the substrate for galvanization may get out of shape. For this reason, the upper limit of the average temperature-raising rate is preferably 20° C./s or less, more preferably 15° C./s or less, and still more preferably 12° C./s or less.

Holding time in temperature range of 600° C. to 620° C.: 20 seconds or more

It is important that the reduction annealing step in the present invention includes a step of holding the sheet temperature of the steel sheet for 20 seconds or more in a temperature range of 600° C. to 620° C. The present inventors have found out that, according to the above-described aggregation mechanism of Si—Mn composite oxide with $MnO_2$ having a low melting point serving as a starting point, the temperature range that should be noted during the temperature raising is a range of 600° C. to 620° C. and, when the period of time for passing through this temperature range is set to 20 seconds or more, a plated steel sheet suppressed in occurrence of bare spot can be obtained (see the examples that will be described later).

In the present description, "holding for 20 seconds or more in a temperature range of 600° C. to 620° C." means that the temperature is raised over 20 seconds or more in this temperature range, that is, that the period of time for passing through this temperature range (holding time) is 20 seconds or more. As long as this requirement is satisfied, the pattern thereof is not particularly limited. For example, the heating may be carried out at a constant average temperature-raising rate all through this temperature range so that the period of time for passing through this temperature range will be 20 seconds or more. As mentioned in the examples described later, the heating may be carried out to include an isothermal holding step of holding a partial region of the above temperature range for a certain period of time. Alternatively, cooling may be carried out in a partial region of the above temperature range. These are examples of the patterns that can be applied in the present invention, so that various patterns can be adopted as long as the requirement of "holding the above temperature range for 20 seconds or more" is satisfied.

With regard to the "sheet temperature of the steel sheet" in the present description, the surface temperature of the steel sheet was measured in the later-described examples; however, the present invention is not limited to the surface temperature. This is because, in the present invention, reduction annealing is carried out by using a thin cold-rolled steel sheet preferably having a sheet thickness of about 0.4 mm or more and 2.3 mm or less, so that, in such a thin cold-rolled steel sheet, a temperature gradient in the sheet thickness direction is substantially not generated.

When the holding temperature of the steel sheet is below 600° C., Mn cannot be concentrated on the steel sheet surface, because recrystallization is not completed yet. For this reason, it is impossible to realize the molten state of the Mn oxide that is intended to be formed on the surface of the substrate for galvanization in the present invention, thereby making it difficult to form a dome-shaped oxide by aggregation. Therefore, the coverage of the surface of the substrate for galvanization with a Si oxide, a Mn oxide, or a Si—Mn composite oxide increases, thereby inhibiting the reactivity between the molten zinc and the surface of the substrate for galvanization. Therefore, the lower limit of the holding temperature of the steel sheet is set to 600° C. or higher. The lower limit is preferably 602° C. or higher, more preferably 605° C. or higher. However, when the holding temperature of the steel sheet exceeds 620° C., deposition of a Si oxide, a Mn oxide, or a Si—Mn composite oxide having a melting point exceeding 900° C. proceeds, and the coverage with the oxide increases, thereby inhibiting the reactivity between the molten zinc and the surface of the substrate for galvanization. For this reason, the upper limit of the holding temperature of the steel sheet is set to 620° C. or lower. The upper limit is preferably 618° C. or lower, more preferably 615° C. or lower.

In addition, when the holding time in the above temperature range is less than 20 seconds, the above effect cannot be fully exhibited, thereby inhibiting the reactivity between the molten zinc and the surface of the substrate for galvanization. For this reason, the lower limit of the holding time is set to 20 seconds or more. The lower limit is preferably 22 seconds or more, more preferably 25 seconds or more. The upper limit of the holding time is not particularly set; however, in consideration of the productivity on an actual line, a time of up to about 40 seconds is appropriate.

Dew point: preferably −55° C. to 0° C.

In the present invention, the dew point is set to be within an industrially adoptable range from the viewpoint of efficiently producing a desired substrate for galvanization by reduction annealing at a low cost without installing new equipment. With respect to the lower limit, it is industrially difficult to set a dew point of less than −55° C., so that the dew point is preferably set to −55° C. or higher, more preferably −50° C. or higher. On the other hand, when the dew point exceeds 0° C., there is a high possibility that dew condensation may occur in a pipe system through which the gas is supplied and, in order to prevent the dew condensation, an equipment investment is needed. For this reason, an upper limit of the dew point is preferably set to 0° C. or lower, more preferably −10° C. or lower.

When the reduction annealing is carried out on a CGL, it is preferable that, after the substrate is heated up to an upper limit temperature of reduction annealing (for example, about 900° C.), a soaking treatment is further carried out. The conditions for the soaking treatment are not particularly limited, and a range that is ordinarily used can be suitably adopted.

For example, the lower limit of the soaking temperature is preferably set to about ($A_{c1}$+50° C.) or higher from the viewpoint of formability and the like. The lower limit is more preferably 780° C. or higher, still more preferably 790° C. or higher. However, when the soaking temperature is too high, the austenite grains become coarse, and the formability decreases. For this reason, the upper limit of the soaking temperature is preferably set to 900° C. or lower, more preferably 890° C. or lower.

In addition, the lower limit of the soaking time in the above soaking temperature range is preferably set to 10 seconds or more. However, in consideration of the productivity and the like, it is preferable that the upper limit of the soaking time is approximately 600 seconds or less.

As a pattern of the soaking treatment, an isothermal holding treatment of holding the substrate for a certain period of time (60 seconds in the examples) in a temperature range of 850° C., for example, may be carried out as shown in the examples described later. However, the present invention is not limited to this isothermal holding treatment.

When the substrate for galvanization obtained in this manner is subjected to galvanization, a hot-dip galvanized steel sheet or a hot-dip galvannealed steel sheet of the present invention is obtained. A galvanization method for the substrate is not particularly limited, so that an ordinarily used method can be adopted.

The substrate for galvanization obtained in the above-described manner is immersed in molten zinc, so as to produce a hot-dip galvanized steel sheet or a hot-dip galvannealed steel sheet.

For example, in the case in which the hot-dip galvanized steel sheet is immersed in molten zinc immediately after the reduction annealing, the steel sheet is cooled to a plating bath temperature. On the other hand, in the case in which the steel sheet is not immediately immersed in molten zinc, the steel sheet is cooled to room temperature. A cooling method is not particularly limited, so that an ordinarily used method can be suitably adopted. For example, a lower limit of an average rate of lowering the temperature to the plating bath temperature or room temperature is preferably approximately 1° C./s or more, more preferably 5° C./s or more, in consideration of the productivity and the like. However, when the average temperature-lowering rate is too high, there is a high possibility that the substrate may get out of shape, so that the upper limit is preferably 50° C./s or less, more preferably 45° C./s or less. An atmosphere at the time of cooling should be a reducing atmosphere. The amount of $H_2$ in the reducing atmosphere at the time of cooling is preferably 5% by volume or more and 10% by volume or less.

The plating bath temperature is not particularly limited and can be set to be within an ordinarily used range; however, the plating bath temperature is preferably about 440° C. to 480° C. A composition of the plating bath is not particularly limited, so that a known hot-dip galvanizing bath may be used. For example, an Al content in the galvanization bath is preferably 0.12% by mass to 0.30% by mass. An amount of deposition of the hot-dip galvanized layer is preferably 60 g/m² to 120 g/m².

When the hot-dip galvanized steel sheet obtained in the above-described manner is subjected to an alloying treatment, a hot-dip galvannealed steel sheet can be produced. An alloying method is not particularly limited, so that known conditions can be adopted. For example, an alloying temperature is preferably about 500° C. to 560° C. When the alloying temperature is too low, an alloying unevenness is likely to be generated. When the alloying temperature is too high, the alloying is promoted too much, and an amount of Fe contained in the hot-dip galvannealed layer becomes excessive, so that a thick F-layer is formed at an interface between the plated layer and the raw material steel sheet, giving rise to a cause of decrease in the close adhesion property of plating. Herein, the Al content in the galvanization bath is preferably 0.08% by mass to 0.13% by mass. In addition, the amount of deposition of plating is preferably 30 g/m² to 70 g/m².

A tensile strength of the hot-dip galvanized steel sheet or hot-dip galvannealed steel sheet of the present invention obtained in the above-described manner is preferably 780 MPa or more, more preferably 980 MPa or more.

The present application claims the benefits of priority based on Japanese Patent Application No. 2014-175945 filed on Aug. 29, 2014 and Japanese Patent Application No. 2015-053267 filed on Mar. 17, 2015. The whole contents of the descriptions of Japanese Patent Application No. 2014-175945 filed on Aug. 29, 2014 and Japanese Patent Application No. 2015-053267 filed on Mar. 17, 2015 are incorporated herein for reference.

EXAMPLES

Hereinafter, the present invention will be more specifically described by way of examples; however, the present invention is not limited by the following examples, and can be carried out with changes within a scope that meets the gist described above and below, and such changes are all included within the technical scope of the present invention. In the following, unless specifically mentioned otherwise, "%" denotes "% by mass".

In the present examples, reduction annealing and plating were carried out with use of a plating simulator after hot rolling and cold rolling were carried out in a laboratory scale. In more detail, steel ingots having various chemical compositions shown in the following Table 1 were melted. In Table 1, "–" denotes 0%.

First, a melted cast piece was heated to 1100° C. and thereafter roughly rolled, so as to obtain a slab having a finishing thickness of 20 mm and a finishing width of 160 mm. Next, this slab was subjected to hot rolling to fabricate a hot-rolled substrate. In more detail, after the slab was heated at 1200° C. for 30 minutes, the slab was subjected to hot rolling under conditions of a finishing temperature of 870° C., a finishing thickness of 2.5 mm, and a coiling temperature of 600° C. Subsequently, the hot-rolled substrate obtained in this manner was pickled with 5% by mass HCl of 80° C., so as to remove a black skin, and thereafter subjected to cold rolling to obtain a cold-rolled substrate having a thickness of 1.2 mm.

Next, from the cold-rolled substrate obtained in this manner, a sample having a size of 70 mm×150 mm was cut out. After the sample was degreased, reduction annealing was carried out with use of a plating simulator under conditions shown in the following Table 2. In more detail, with use of an infrared heating furnace, the sample was heated in a reducing atmosphere at an average temperature-raising rate of 10° C./s from room temperature to the isothermal temperature shown in Table 2, and thereafter, the sample was held at that temperature for a certain period of time. Subsequently, after the sample was heated at an average temperature-raising rate of 10° C./s to the temperature shown in the column of Soaking treatment, the sample was subjected to a soaking treatment at that temperature for 60 seconds. The dew point was set to −40° C. in Test No. 11 of Table 2, and was set to −55° C. in all of Test Nos. 1 to 10 and Test Nos. 12 to 34 in Table 2.

After the soaking treatment, the sample was immediately subjected to $N_2$ cooling in a reducing atmosphere at an average temperature-lowering rate of 5.2° C./s down to room temperature, so as to fabricate a substrate for galvanization.

The Fe exposure rate of the substrate for galvanization obtained in this manner was measured in the following manner. First, a test piece of 10×10 mm was cut out from an arbitrary site of the substrate for galvanization. A surface of this test piece was observed with use of an electron probe microanalyses at a measurement magnification of 3000 times. The position of measurement was around the center of the test piece. Detailed measurement conditions are as follows.

EPMA apparatus (EPMA-8705 manufactured by Shimadzu Corporation)
Acceleration voltage: 20 kV
Sample current: 0.01 μA
Beam diameter: 3 μm in diameter
X-ray: Kα ray
Measurement area: 33.6 μm×41.4 μm A mapping intensity of Fe, measured under the conditions described above, of 0 to 240 was divided at an interval of 15 (that is, divided into 16 parts), and a rate of an area occupied by an Fe mapping intensity of 195 or more in the above measurement field of view was determined.

Next, the sample was subjected to a soaking treatment in the same manner as in the fabrication of the substrate for galvanization. Then, after the sample was subjected to $N_2$ cooling in a reducing atmosphere at an average temperature-lowering rate of 5.2° C./s down to 460° C., the sample was immersed in molten zinc, so as to fabricate a hot-dip galvanized steel sheet. Specifically, within the substrate for galvanization having a size of 70 mm×150 mm, a part having a size of 70 mm×130 mm, excluding some parts including a part where a jig for immersion was attached, was used as a part to be subjected to a galvanization treatment, and the plating treatment was carried out under conditions of a plating bath temperature of 460° C., an Al amount in the plating bath of 0.13% by mass (Test Nos. 1 to 25, 27, 29, and 31) or 0.23% by mass (Test Nos. 33 and 34), and an immersion time of 2 seconds.

In addition, with respect to Test Nos. 26, 28, 30, and 32, an alloying treatment was further carried out after the plating treatment, so as to fabricate a hot-dip galvannealed steel sheet. Specifically, an alloying treatment was further carried out after the plating treatment was carried out in the same manner as described above except that the Al amount in the plating bath was set to 0.11% by mass so that the alloying might easily proceed. The conditions for the alloying treatment were such that, with use of the same infrared heating furnace as in the reduction annealing, the temperature was raised up to 550° C. in a reducing atmosphere at an average temperature-raising rate of 10° C./s and, after the sample was held at 550° C. for 90 seconds, $N_2$ cooling was immediately carried out down to room temperature at an average temperature-lowering rate of 5.2° C./s.

An area rate of the bare spot of the galvanized steel sheet obtained in this manner was determined by eye inspection and was evaluated according to the following standard. Specifically, within the above galvanized part having a size of 70 mm×130 mm, a part having a size of 70 mm×100 mm excluding a part where the plating was likely to be deposited thickly (70 mm×30 mm) was used as a measurement target part. A part where the bare spot had occurred in the measurement target part was traced with use of a felt-tip pen on a transparent OHP (Overhead Projector) sheet, and the sheet was superposed onto a semitransparent grid paper sheet, so as to accumulate the area of the bare spot part, whereby bare spot area was determined. This bare spot area was divided by the measurement target area (70 mm×100 mm) to obtain the area rate of the bare spot. A method for evaluating the area rate of the bare spot is as follows.

Good: area rate of the bare spot has 0% or more and 3% or less

Poor: area rate of the bare spot exceeds 3%

In the present examples, the area rate of the bare spot was calculated by the above method; however, the calculation method is not limited to the above method. For example, the above OHP sheet may be put on an image analyzing apparatus to calculate the area rate of the bare spot.

The results of the examples are shown in Table 2. In Table 2, GI represents a hot-dip galvanized steel sheet, and GA represents a hot-dip galvannealed steel sheet. In Table 2, "–" in the column of "Reduction annealing" means that the isothermal holding was not carried out.

TABLE 1

| | Chemical composition (% by mass, the remainder being iron and inevitable impurities) | | | | | | | | | | | |
|---|---|---|---|---|---|---|---|---|---|---|---|---|
| Steel kind | C | Si | Mn | P | S | Al | Cr | Mo | Ti | Nb | B | Si/Mn |
| Steel kind 1 | 0.121 | 1.00 | 2.62 | 0.010 | 0.004 | 0.045 | 0.30 | 0.10 | — | — | — | 0.38 |
| Steel kind 2 | 0.126 | 1.39 | 2.16 | 0.010 | 0.004 | 0.045 | 0.30 | 0.10 | — | — | — | 0.64 |
| Steel kind 3 | 0.125 | 1.52 | 1.61 | 0.010 | 0.004 | 0.045 | 0.30 | 0.10 | — | — | — | 0.94 |
| Steel kind 4 | 0.126 | 1.44 | 1.89 | 0.010 | 0.004 | 0.045 | 0.30 | 0.10 | — | — | — | 0.76 |
| Steel kind 5 | 0.124 | 1.52 | 2.43 | 0.010 | 0.004 | 0.045 | 0.30 | 0.10 | — | — | — | 0.63 |
| Steel kind 6 | 0.124 | 1.21 | 2.63 | 0.010 | 0.004 | 0.045 | 0.30 | 0.10 | — | — | — | 0.46 |
| Steel kind 7 | 0.126 | 1.17 | 2.37 | 0.010 | 0.004 | 0.045 | 0.30 | 0.10 | — | — | — | 0.49 |
| Steel kind 8 | 0.126 | 1.19 | 2.00 | 0.010 | 0.004 | 0.045 | 0.30 | 0.10 | — | — | — | 0.60 |
| Steel kind 9 | 0.110 | 1.03 | 2.72 | 0.010 | 0.004 | 0.045 | 0.30 | 0.10 | — | — | 0.0016 | 0.38 |
| Steel kind 10 | 0.127 | 1.83 | 1.87 | 0.010 | 0.004 | 0.045 | 0.30 | 0.10 | — | — | — | 0.98 |
| Steel kind 11 | 0.124 | 1.39 | 1.03 | 0.010 | 0.004 | 0.045 | 0.30 | 0.10 | — | — | — | 1.35 |
| Steel kind 12 | 0.124 | 1.81 | 2.34 | 0.010 | 0.004 | 0.045 | 0.30 | 0.10 | — | — | — | 0.77 |
| Steel kind 13 | 0.122 | 1.85 | 2.64 | 0.010 | 0.004 | 0.045 | 0.30 | 0.10 | — | — | — | 0.70 |
| Steel kind 14 | 0.123 | 1.42 | 2.21 | 0.010 | 0.004 | 0.045 | — | — | — | — | — | 0.64 |
| Steel kind 15 | 0.121 | 1.39 | 2.18 | 0.010 | 0.004 | 0.045 | 0.30 | — | — | — | — | 0.64 |
| Steel kind 16 | 0.122 | 1.44 | 2.29 | 0.010 | 0.004 | 0.045 | — | 0.10 | — | — | — | 0.63 |
| Steel kind 17 | 0.121 | 1.39 | 2.20 | 0.010 | 0.004 | 0.045 | — | — | 0.073 | — | — | 0.63 |
| Steel kind 18 | 0.122 | 1.36 | 2.26 | 0.010 | 0.004 | 0.045 | — | — | — | 0.049 | — | 0.60 |
| Steel kind 19 | 0.121 | 1.38 | 2.23 | 0.010 | 0.004 | 0.045 | — | — | 0.049 | 0.049 | — | 0.62 |

TABLE 2A

| | | Reduction annealing | | | Soaking treatment | $H^2$ concentration (% by volume) | Fe exposure rate (%) | Bare spot | | | Al amount in plating bath (% by mass) |
|---|---|---|---|---|---|---|---|---|---|---|---|
| Test No. | Steel kind | Isothermal temperature (° C.) | Isothermal time (sec) | Holding time (sec) at 600° C. to 620° C. | Temperature (° C.)/ Time (sec) | | | Area rate (%) | Determination | Plating kind | |
| 1 | Steel kind 1 | 600 | 20 | 22 | 850/60 | 5 | 81.8 | 0.8 | Good | GI | 0.13 |
| 2 | Steel kind 2 | 600 | 20 | 22 | 850/60 | 5 | 74.8 | 2.2 | Good | GI | 0.13 |
| 3 | Steel kind 3 | 600 | 20 | 22 | 850/60 | 5 | 82.5 | 2.0 | Good | GI | 0.13 |
| 4 | Steel kind 4 | 600 | 20 | 22 | 850/60 | 5 | 79.0 | 2.7 | Good | GI | 0.13 |
| 5 | Steel kind 5 | 600 | 20 | 22 | 850/60 | 5 | 77.1 | 2.5 | Good | GI | 0.13 |
| 6 | Steel kind 6 | 600 | 20 | 22 | 850/60 | 5 | 71.9 | 2.1 | Good | GI | 0.13 |
| 7 | Steel kind 7 | 600 | 20 | 22 | 850/60 | 5 | 77.9 | 0.2 | Good | GI | 0.13 |
| 8 | Steel kind 8 | 600 | 20 | 22 | 850/60 | 5 | 78.1 | 1.7 | Good | GI | 0.13 |
| 9 | Steel kind 9 | 600 | 20 | 22 | 850/60 | 5 | 79.8 | 0.4 | Good | GI | 0.13 |
| 10 | Steel kind 2 | 600 | 30 | 32 | 850/60 | 5 | 79.4 | 2.2 | Good | GI | 0.13 |
| 11 | Steel kind 7 | 600 | 20 | 22 | 850/60 | 5 | 72.8 | 0.2 | Good | GI | 0.13 |
| 12 | Steel kind 2 | 620 | 20 | 22 | 850/60 | 5 | 81.8 | 1.6 | Good | GI | 0.13 |
| 13 | Steel kind 2 | 600 | 20 | 22 | 850/60 | 10 | 85.3 | 1.7 | Good | GI | 0.13 |
| 14 | Steel kind 10 | 600 | 20 | 22 | 850/60 | 5 | 56.1 | 79.6 | Poor | GI | 0.13 |
| 15 | Steel kind 11 | 600 | 20 | 22 | 850/60 | 5 | 40.9 | 13.6 | Poor | GI | 0.13 |

TABLE 2A-continued

| Test No. | Steel kind | Reduction annealing Isothermal temperature (° C.) | Iso-thermal time (sec) | Holding time (sec) at 600° C. to 620° C. | Soaking treatment Temperature (° C.)/ Time (sec) | $H_2$ concentration (% by volume) | Fe exposure rate (%) | Bare spot Area rate (%) | Determination | Plating kind | Al amount in plating bath (% by mass) |
|---|---|---|---|---|---|---|---|---|---|---|---|
| 16 | Steel kind 12 | 600 | 20 | 22 | 850/60 | 5 | 32.5 | 16.7 | Poor | GI | 0.13 |
| 17 | Steel kind 13 | 600 | 20 | 22 | 850/60 | 5 | 65.4 | 72.0 | Poor | GI | 0.13 |
| 18 | Steel kind 2 | — | — | 2 | 850/60 | 5 | 21.9 | 24.3 | Poor | GI | 0.13 |
| 19 | Steel kind 3 | — | — | 2 | 850/60 | 5 | 67.2 | 22.3 | Poor | GI | 0.13 |
| 20 | Steel kind 2 | 600 | 15 | 17 | 850/60 | 5 | 46.1 | 20.5 | Poor | GI | 0.13 |
| 21 | Steel kind 2 | 590 | 20 | 2 | 850/60 | 5 | 61.8 | 28.7 | Poor | GI | 0.13 |
| 22 | Steel kind 2 | 630 | 20 | 2 | 850/60 | 5 | 56.1 | 25.4 | Poor | GI | 0.13 |
| 23 | Steel kind 2 | 600 | 20 | 22 | 850/60 | 13 | 53.2 | 55.0 | Poor | GI | 0.13 |
| 24 | Steel kind 2 | 600 | 20 | 22 | 850/60 | 18 | 60.8 | 68.0 | Poor | GI | 0.13 |

TABLE 2B

| Test No. | Steel kind | Reduction annealing Isothermal temperature (° C.) | Iso-thermal time (sec) | Holding time (sec) at 600° C. to 620° C. | Soaking treatment Temperature (° C.)/ Time (sec) | $H_2$ concentration (% by volume) | Fe exposure rate (%) | Bare spot Area rate (%) | Determination | Plating kind | Al amount in plating bath (% by mass) |
|---|---|---|---|---|---|---|---|---|---|---|---|
| 25 | Steel kind 14 | 600 | 20 | 22 | 850/60 | 5 | 86.5 | 0.1 | Good | GI | 0.13 |
| 26 | Steel kind 14 | 600 | 20 | 22 | 850/60 | 5 | 86.5 | 0.2 | Good | GA | 0.11 |
| 27 | Steel kind 15 | 600 | 20 | 22 | 850/60 | 5 | 71.8 | 1.6 | Good | GI | 0.13 |
| 28 | Steel kind 15 | 600 | 20 | 22 | 850/60 | 5 | 71.8 | 1.8 | Good | GA | 0.11 |
| 29 | Steel kind 16 | 600 | 20 | 22 | 850/60 | 5 | 70.0 | 1.4 | Good | GI | 0.13 |
| 30 | Steel kind 16 | 600 | 20 | 22 | 850/60 | 5 | 70.0 | 1.2 | Good | GA | 0.11 |
| 31 | Steel kind 17 | 600 | 20 | 22 | 850/60 | 5 | 80.5 | 0.2 | Good | GI | 0.13 |
| 32 | Steel kind 17 | 600 | 20 | 22 | 850/60 | 5 | 80.5 | 1.0 | Good | GA | 0.11 |
| 33 | Steel kind 18 | 600 | 20 | 22 | 850/60 | 5 | 74.9 | 0.8 | Good | GI | 0.23 |
| 34 | Steel kind 19 | 600 | 20 | 22 | 850/60 | 5 | 71.0 | 0.2 | Good | GI | 0.23 |

From Tables 1 and 2, the results can be studied as follows.

Test Nos. 1 to 13 and 25 to 34 of Table 2 all satisfy the chemical composition and the reduction annealing conditions defined in the present invention, and it will be understood that these samples are excellent in the effect of suppressing the bare spot.

In contrast, Test Nos. 14 to 24 each did not satisfy one of the requirements of the present invention, so that these samples were poor in the effect of suppressing the bare spot.

Test No. 14 is an example in which the steel kind 10 of Table 1 containing a large amount of Si was used, so that the Fe exposure rate was small, and this sample was poor in the effect of suppressing the bare spot.

Test No. 15 is an example in which the steel kind 11 of Table 1 having a high ratio of Si/Mn was used, so that the Fe exposure rate was small, and this sample was poor in the effect of suppressing the bare spot.

Test Nos. 16 and 17 are examples in which the steel kinds 12 and 13 of Table 1 containing a large amount of Si were respectively used, so that the Fe exposure rate was small, and these samples were poor in the effect of suppressing the bare spot.

Test Nos. 18 and 19 are examples in which the steel kinds 2 and 3 of Table 1 satisfying the composition of the present invention were respectively used, and are each a comparative example approximately simulating No. 59 of Table 2 of Patent Literature 1. Patent Literature 1 discloses numerous experimental examples. Among them, No. 59 is an example that satisfies the chemical components defined in the present invention and was reductively annealed in an atmosphere ($N_2$ atmosphere containing a predetermined amount of $H_2$) in the reduction annealing. However, as shown in Table 2, the holding time at 600° C. to 620° C. was below 20 seconds. For this reason, the Fe exposure rate was small, and this sample was poor in the effect of suppressing the bare spot.

Test No. 20 is an example in which the steel kind 2 of Table 1 satisfying the composition of the present invention was used, but the holding time at 600° C. to 620° C. was below 20 seconds, so that the Fe exposure rate was small, and this sample was poor in the effect of suppressing the bare spot.

Test No. 21 is an example in which the steel kind 2 of Table 1 satisfying the composition of the present invention was used, but the heating holding temperature at the time of reduction annealing was low, and the holding time at 600° C. to 620° C. was below 20 seconds, so that the Fe exposure rate was small, and this sample was poor in the effect of suppressing the bare spot.

Test No. 22 is an example in which the steel kind 2 of Table 1 satisfying the composition of the present invention was used, but the heating holding temperature at the time of reduction annealing was high, and the holding time at 600° C. to 620° C. was below 20 seconds, so that the Fe exposure rate was small, and this sample was poor in the effect of suppressing the bare spot.

Test No. 23 is an example in which the steel kind 2 of Table 1 satisfying the composition of the present invention was used and is a comparative example approximately simulating No. 60 of Table 2 of Patent Literature 1. No. 60 is an example that satisfies the chemical components defined in the present invention and, as calculated from Table 2, the holding time at 600° C. to 620° C. was about 24 seconds, thereby satisfying the requirement of the present invention, but the $H_2$ concentration at the time of reduction annealing exceeded the upper limit (10% by volume) defined in the present invention. For this reason, the Fe exposure rate was small, and this sample was poor in the effect of suppressing the bare spot.

Test No. 24 is an example in which the steel kind 2 of Table 1 satisfying the composition of the present invention was used, but the $H_2$ concentration at the time of reduction annealing was high, so that the Fe exposure rate was small, and this sample was poor in the effect of suppressing the bare spot.

The invention claimed is:

1. A substrate for hot-dip galvanizing or hot-dip galvannealing, which is a substrate obtained by subjecting a steel sheet comprising in percent by mass:
   C: from 0.06% to 0.3%,
   Si: from 1.00% to 1.6%,
   Mn: from 1% to 3%, and
   Al: from more than 0% to 0.1%,
   and satisfying a mass ratio of Si/Mn of 1.0 or less, to reduction annealing,
   wherein
   when a mapping intensity of Fe, which is observed in a measurement field of view of 33.6 μm×41.4 μm on a surface of the substrate by performing mapping of Fe using an electron probe microanalyser, of 0 to 240 is divided into 16 parts at an interval of 15, an area occupied by a mapping intensity of 195 or more relative to the whole measurement field of view is an area rate of 70% or more.

2. The substrate for hot-dip galvanizing or hot-dip galvannealing according to claim 1, comprising from 0.08% to 0.25% of C.

3. The substrate for hot-dip galvanizing or hot-dip galvannealing according to claim 1, comprising from 1.1% to 1.5% of Si.

4. The substrate for hot-dip galvanizing or hot-dip galvannealing according to claim 1, comprising from 1.2% to 2.8% of Mn.

5. The substrate for hot-dip galvanizing or hot-dip galvannealing according to claim 1, comprising from 0.02% to 0.09% of Al.

6. The substrate for hot-dip galvanizing or hot-dip galvannealing according to claim 1, wherein the mass ratio of Si/Mn is from 0.98 to 0.33.

7. The substrate for hot-dip galvanizing or hot-dip galvannealing according to claim 1, wherein the mass ratio of Si/Mn is from 0.95 to 0.38.

8. The substrate for hot-dip galvanizing or hot-dip galvannealing according to claim 1, further comprising, in percent by mass, at least one selected from the group consisting of the following (a) to (c):
   (a) at least one element selected from the group consisting of from more than 0% to 1% of Cr and from more than 0% to 1% of Mo,
   (b) from more than 0% to 0.005% of B, and
   (c) at least one element selected from the group consisting of from more than 0% to 0.1% of Ti and from more than 0% to 0.1% of Nb.

9. A hot-dip galvanized steel sheet or a hot-dip galvannealed steel sheet obtained by hot-dip galvanizing or hot-dip galvannealing of a substrate,
   wherein the substrate is obtained by subjecting a steel sheet comprising in percent by mass:
   C: from 0.06% to 0.3%,
   Si: from 1.00% to 1.6%,
   Mn: from 1% to 3%, and
   Al: from more than 0% to 0.1%,
   and satisfying a mass ratio of Si/Mn of 1.0 or less, to reduction annealing,
   wherein
   when a mapping intensity of Fe, which is observed in a measurement field of view of 33.6 μm×41.4 μm on a surface of the substrate by performing mapping of Fe using an electron probe microanalyser, of 0 to 240 is divided into 16 parts at an interval of 15, an area occupied by a mapping intensity of 195 or more relative to the whole measurement field of view is an area rate of 70% or more.

10. A hot-dip galvanized steel sheet or a hot-dip galvannealed steel sheet obtained by hot-dip galvanizing or hot-dip galvannealing of a substrate,
    wherein the substrate is obtained by subjecting a steel sheet comprising in percent by mass:
    C: from 0.06% to 0.3%,
    Si: from 1.00% to 1.6%,
    Mn: from 1% to 3%,
    Al: from more than 0% to 0.1%, and
    at least one selected from the group consisting of the following (a) to (c):
    (a) at least one element selected from the group consisting of from more than 0% to 1% of Cr and from more than 0% to 1% of Mo,
    (b) from more than 0% to 0.005% of B, and
    (c) at least one element selected from the group consisting of from more than 0% to 0.1% of Ti and from more than 0% to 0.1% of Nb, and
    satisfying a mass ratio of Si/Mn of 1.0 or less, to reduction annealing,
    wherein
    when a mapping intensity of Fe, which is observed in a measurement field of view of 33.6 μm×41.4 μm on a surface of the substrate by performing mapping of Fe using an electron probe microanalyser, of 0 to 240 is divided into 16 parts at an interval of 15, an area occupied by a mapping intensity of 195 or more relative to the whole measurement field of view is an area rate of 70% or more.

11. A steel sheet that has been subjected to reduction annealing comprising in percent by mass:
    C: from 0.06% to 0.3%,
    Si: from 1.00% to 1.6%,
    Mn: from 1% to 3%, and
    Al: from more than 0% to 0.1%, and
    a mass ratio of Si/Mn is 1.0 or less,
    wherein the reduction annealing comprises:
    heating which is carried out in a nitrogen atmosphere comprising from 5% by volume to 10% by volume of $H_2$,
    the heating is carried out at an average temperature-raising rate of 2° C./s to 20° C./s except for a temperature range of from 600° C. to 620° C.,
    the heating comprises holding a sheet temperature of the steel sheet for 22 seconds to 40 seconds at a temperature of from 600° C. to 620° C., and
    the holding comprises an isothermal holding of a partial region of the temperature range from 600° C. to 620° C. for a certain period of time.

12. The steel sheet of claim 11 that has been hot-dip galvanized.

13. The steel sheet of claim 11 that has been hot-dip galvannealed.

14. A method for producing a substrate for hot-dip galvanizing or hot-dip galvannealing, the method comprising:
subjecting a steel sheet comprising in percent by mass:
C: from 0.06% to 0.3%,
Si: from 1.00% to 1.6%,
Mn: from 1% to 3%, and
Al: from more than 0% to 0.1%,
and satisfying a mass ratio of Si/Mn of 1.0 or less,
to reduction annealing in a nitrogen atmosphere comprising 5% by volume to 10% by volume of $H_2$,
wherein the reduction annealing comprises holding a sheet temperature of the steel sheet for 20 seconds or more at a temperature of from 600° C. to 620° C., and
wherein when a mapping intensity of Fe, which is observed in a measurement field of view of 33.6 μm×41.4 μm on a surface of the substrate by performing mapping of Fe using an electron probe microanalyser, of 0 to 240 is divided into 16 parts at an interval of 15, an area occupied by a mapping intensity of 195 or more relative to the whole measurement field of view is an area rate of 70% or more.

15. A method for producing a substrate for hot-dip galvanizing or hot-dip galvannealing, the method comprising:
subjecting a steel sheet comprising in percent by mass:
C: from 0.06% to 0.3%,
Si: from 1.00% to 1.6%,
Mn: from 1% to 3%, and
Al: from more than 0% to 0.1%,
and satisfying a mass ratio of Si/Mn of 1.0 or less, and
further comprising, in percent by mass, at least one selected from the group consisting of the following (a) to (c):
at least one element selected from the group consisting of from more than 0% to 1% of Cr and from more than 0% to 1% of Mo,
from more than 0% to 0.005% of B, and
at least one element selected from the group consisting of from more than 0% to 0.1% of Ti and from more than 0% to 0.1% of Nb,
to reduction annealing in a nitrogen atmosphere comprising 5% by volume to 10% by volume of $H_2$,
wherein the reduction annealing comprises holding a sheet temperature of the steel sheet for 20 seconds or more at a temperature of from 600° C. to 620° C., and
wherein when a mapping intensity of Fe, which is observed in a measurement field of view of 33.6 μm×41.4 μm on a surface of the substrate by performing mapping of Fe using an electron probe microanalyser, of 0 to 240 is divided into 16 parts at an interval of 15, an area occupied by a mapping intensity of 195 or more relative to the whole measurement field of view is an area rate of 70% or more.

\* \* \* \* \*